(12) United States Patent
Tailliez et al.

(10) Patent No.: US 8,271,446 B2
(45) Date of Patent: Sep. 18, 2012

(54) PROCESS OF IMPORT/EXPORT OF DATA OF A DATABASE

(75) Inventors: Franck Tailliez, Leognan (FR); Martin Defour, Crossy S/Seine (FR)

(73) Assignee: Thales, Neuilly sur Seine (FR)

( * ) Notice: Subject to any disclaimer, the term of this patent is extended or adjusted under 35 U.S.C. 154(b) by 393 days.

(21) Appl. No.: 12/463,765

(22) Filed: May 11, 2009

(65) Prior Publication Data

US 2010/0011005 A1 Jan. 14, 2010

(30) Foreign Application Priority Data

May 13, 2008 (FR) ..................................... 08 02592

(51) Int. Cl.
*G06F 17/30* (2006.01)
(52) U.S. Cl. ........................ 707/658; 707/758; 707/769
(58) Field of Classification Search .................. 707/658, 707/758, 769
See application file for complete search history.

(56) References Cited

U.S. PATENT DOCUMENTS

| | | | | |
|---|---|---|---|---|
| 5,625,818 A | * | 4/1997 | Zarmer et al. ........................ | 1/1 |
| 5,809,503 A | | 9/1998 | Aoshima et al. | |
| 5,819,296 A | * | 10/1998 | Anderson et al. ...................... | 1/1 |
| 6,195,662 B1 | * | 2/2001 | Ellis et al. .............................. | 1/1 |
| 6,240,428 B1 | * | 5/2001 | Yeung et al. ........................... | 1/1 |
| 6,356,901 B1 | * | 3/2002 | MacLeod et al. ..................... | 1/1 |
| 6,615,202 B1 | * | 9/2003 | Ding et al. ............................. | 1/1 |
| 7,673,282 B2 | * | 3/2010 | Amaru et al. ................. | 717/104 |
| 2005/0091346 A1 | * | 4/2005 | Krishnaswami et al. ...... | 709/220 |
| 2006/0111943 A1 | * | 5/2006 | Wu ................................... | 705/3 |
| 2008/0281824 A1 | * | 11/2008 | Rangadass et al. ............... | 707/8 |

OTHER PUBLICATIONS

Chen, Ruey-Shun, et al., "Developing an XML framework for metadata system", ISICT '03, Trinity College, Dublin, Ireland, © 2003, pp. 267-272.*
Dietrich, Suzanne W., et al., "Exploring XML for Data Exchange in the Context of an Undergraduate Database Curriculum", SIGCSE '05, St. Louis, MO, Feb. 23-27, 2005, pp. 53-57.*
Shui, William M., et al., "Application of XML Schema and Active Rules System in Management and Integration of Heterogeneous Biological Data", BIBE 2003, IEEE Computer Society, © 2003, pp. 367-374.*
Combi, Carlo, et al., "Building XML Documents and Schemas to Support Object Data Exchange and Communication", DEXA 2005, LNCS 3588, Springer-Verlag, Berlin, Germany, © 2005, pp. 353-364.*

(Continued)

*Primary Examiner* — Phong Nguyen
*Assistant Examiner* — Dennis Myint
(74) *Attorney, Agent, or Firm* — Stroock & Stroock & Lavan LLP

(57) ABSTRACT

The present invention relates to a system to implement a method of importing exporting data originating from a database by way of an XML file. The export method includes the steps of: selecting data from the database; requesting an export of the selected data; verifying that the selected data are not reserved in the database; constructing an export set comprising the selected data that are not reserved; reserving the selected data not reserved in the database; generating a data exchange file comprising the data of the export set, the data exchange file being constructed according to a data exchange file model, the file model describing types of data, links between the types of data, existing in the database; and transferring the exchange file generated to the second computer.

10 Claims, 11 Drawing Sheets

OTHER PUBLICATIONS

Varlamis, Iraklis, et al., "Bridging XML-Schema and relational databases. A system for generating and manipulating relational databases using valid XML documents", DocEng '01, Atlanta, GA, Nov. 9-10, 2001, pp. 105-114.*

Giovanni Guardalben, Shaku Atre: "Intergrating XML and Relational Database Technologies: A Position Paper" 2004, 24 pages.

Rys M Ed—Institute of Electrical and Electronics Engineers: "Bringing the internet to you database: using SQL server 2000 and XML to build loosely-coupled systems" Proceedings 17th. International Conference on Data Engineering. Apr. 2, 2001, pp. 465-472.

Bourret, et al: "A generic load/extract utility for data transfer between XML documents and relational databases" Proceeding of International Workshop on advance issues Ofe-Commerce and Web-Based Information Systems, Jan. 1, 2000, 10 pages.

Stefan Bottcher, et al: "Transaction Synchronization for XML Data in Client-Server Web Applications" GI Jahrestagung 2001, pp. 388-395.

Morshed Osmani, Syed. Rahman: "A Transaction Synchronization Protocol for XML Database in Web Architecture" MICS 2006, Apr. 2006, 10 pages.

N. Bhatti, et al. "Object Serialization and Deserialization Using XML", Feb. 27, 2009, 10 pages.

* cited by examiner

```
<xsd:schema xmlns:xsd="http://www.w3.org/2001/XMLSchema" xmlns: ecore="http://www.eclipse.org/emf/2002/Ecore" xmlns="Analysis"
targetNamespace="AnalysisDesc">
    <xsd:element name=« R » type=« Root »> ⟵ 41
    </xsd:element>
    <xsd:complexType name=« Root »>                                                                              ⟵ 43
        <xsd:sequence>
            <xsd:element name=« xxx » type=« XXXType » minOccurs="0" maxOccurs=« unbounded »/>
        </xsd:sequence>
        <xsd:attribute name="Id" type="xsd:ID" use="required« />
    </xsd:complexType>
    <xsd:complexType name=«XXXType »>                                                                            ⟵ 44
        <xsd:sequence>
            <xsd:element name=«yyy » type=« YYYType » minOccurs="0" maxOccurs=« unbounded« />
        </xsd:sequence>
        <xsd:attribute name="Id" type="xsd:ID" use="required« />
    </xsd:complexType>
    <xsd:complexType name=«YYYType »>                                              ⟵ 40
        <xsd:sequence>
            <xsd:element name=«yyy » type=« YYYType» minOccurs="0" maxOccurs=« unbounded » />
            <xsd:element name=«ccc » type=« CCCType » minOccurs="0" maxOccurs=« unbounded » />   ⟵ 45
            <xsd:element name=«bbb » type=« xsd:anyURI » minOccurs="0" maxOccurs=« unbounded » />
            <xsd:element name=«aaa » type=« xsd:anyURI » minOccurs="0" maxOccurs=« unbounded » />
        </xsd:sequence>
        <xsd:attribute name=« Id » type=« xsd:Id » use=« required » />
    </xsd:complexType>
    <xsd:complexType name=«CCCType »>                                                                            ⟵ 46
        <xsd:sequence>
            xsd:element name=«aaa » type=« xsd:anyURI »  minOccurs=«0" maxOccurs=« unbounded » />
        </xsd:sequence>
        <xsd:attribute name=« Id » type=« xsd:Id » use=« required » />
    </xsd:complexType>
</xsd:schema>
```

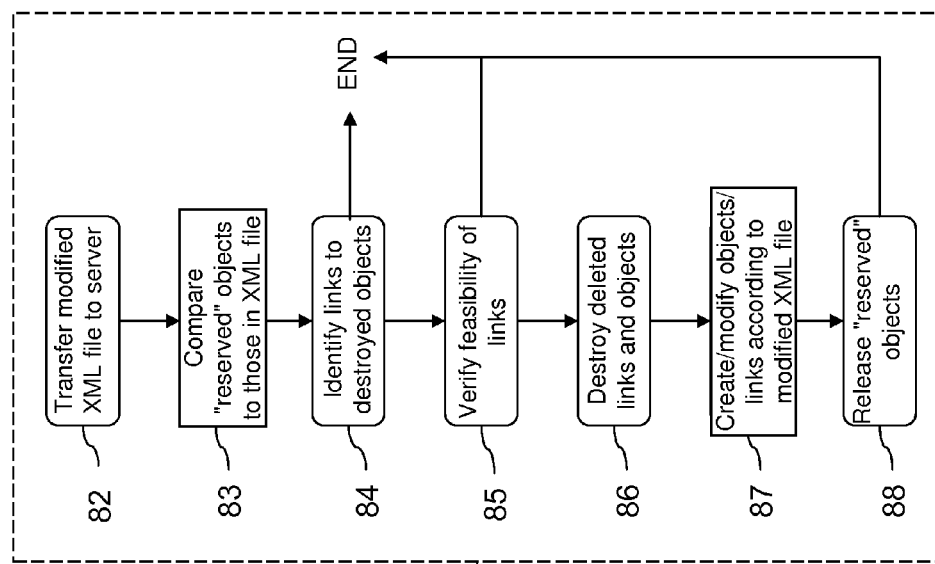
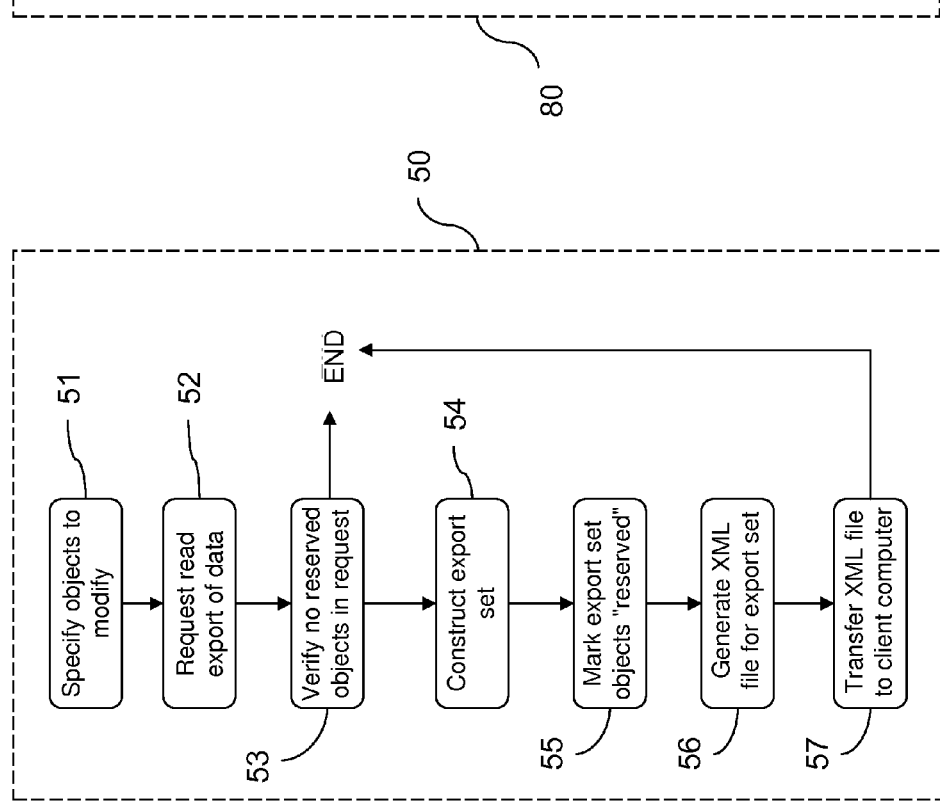

PROCESS OF IMPORT/EXPORT OF DATA OF A DATABASE

CROSS REFERENCE TO RELATED APPLICATIONS

The present application claims priority to French Patent Application Serial No. 0802592, filed on May 13, 2008.

BACKGROUND OF THE INVENTION

The present invention relates to a method of importing exporting data originating from a database by way of an XML file, the acronym standing for the expression eXtensible Markup Language.

The present invention finds notably one of its applications in the field of system and software engineering.

BRIEF DESCRIPTION OF THE PRIOR ART

During the phases of analysis and design of hardware or software systems, teams of designers need to exchange data. These data make it possible notably to structurally and functionally describe the system to be designed. These data are notably formal data relating to system and software engineering. The formal data relating to system and software engineering can be represented as a set of objects. These objects are defined by attributes and are linked together by relationships which can be composition relationships or reference relationships. The data are managed and stored in one or more databases. A database makes it possible notably to manage the persistence of the data, their sharing between various users and the management of the various versions of the whole data set. A database can notably comprise a computer on which database management software can be executed along with one or more hard disks for storing the data of the database.

The data describing the system can be utilized, not only by various users belonging to teams performing the analysis and the design of the system, but also through various software tools for design or for analysing data.

Access to the data stored in the database is achieved notably via computers linked, for example by a data transport network, to the database.

The users of the various design teams can notably perform:
  exports of data from the database to applications performed on the computers linked to the database;
  imports of data from the applications performed on the computers linked to the database, to the database.

The applications using the data can be system analysis and design software tools. The existing import and export methods are specific to each software tool. To access to the data via a software tool, import and export methods are developed, utilizing the data of the database, while allowing exchanges with another software tool.

Import and export methods are expensive to develop. Their cost is all the greater if various import export methods are developed for each software tool.

Moreover, the objects are described in the database according to an object model defined by a meta-model. The meta-model describes the possible relationships between the various objects of the database, as well as the various types of objects present in the database. Any modification of the meta-model also requires a modification of the import export methods for each of the software tools used. Now, in an analysis and design phase, the meta-model is liable to evolve and therefore to undergo multiple modifications. This then gives rise to a significant additional cost in terms of development of the import and export methods. This also hampers the flexibility of use of the database import export methods.

SUMMARY OF THE INVENTION

An aim of the invention is notably to alleviate the aforesaid drawbacks. For this purpose, the subject of the invention is a data import export method. The data can be stored on at least one hard disc of a database. The database can be managed by a first software application by means of at least one processor of a first computer. The export of data is performed from the database to at least one second computer. The second computer can notably comprise at least one processor on which at least one second software application is performed. The second software application is notably able to create, modify and delete data of the database. The import export method comprises notably a first export method and a second import method.

The export method can comprise at least the following steps, carried out, for example, by the first software application:
  selection of data of the database;
  request for export of the selected data;
  verification that the selected data are not reserved in the database;
  construction of an export set comprising the selected data that are not reserved;
  reservation of the selected data not reserved in the database;
  generation of a data exchange file. The data exchange file comprises notably the data of the export set. The data exchange file can be constructed according to a data exchange file model. The file model describes notably types of data, links between the types of data, existing in the database;
  transfer of the exchange file generated to the second computer.

The import method can comprise at least the following steps:
  transfer of a new data exchange file, to the first computer. The new data exchange file comprises notably the data of the export set, modifications performed on the selected data by the second software application;
  comparison, by the first software application, of the selected data of the new data exchange file with the selected data present in the database, so as to identify deletions of objects performed on the selected data;
  verification of the feasibility of the modifications performed on the selected data, present in the new exchange file, with respect to the selected data present in the database;
  deletion of the data, links, deleted during the modifications performed on the selected data, possibly being deleted;
  modification of the selected data possibly being modified in the database;
  de-reservation of the selected data in the database.

The data of the database can be represented by objects, organized into a data model. The data model can be constructed according to a data meta-model. The meta-model describes notably types of objects existing in the database, possible links between the types of objects of the database.

The file model describes the types of object and the links between the types of objects defined in the data meta-model, the links between the objects being reference, composition links.

The selected data are objects of an export subset. The export set comprises notably:
- a first root object of the objects of the export subset;
- a set of objects descending from the first root object by following the composition links between the objects in the data model;
- a set of reference links of which a source object is included in the set of objects of the export subset.

The generation of the data exchange file can be performed by browsing the objects of the export set through the composition links between the objects and of the export set, starting from the root object, describing for each object traversed attributes of the object, reference links whose object is the source.

The verification of feasibility comprises notably a first identification of links between a source object, not belonging to the export set, and a destination object deleted from the export subset.

The verification of feasibility comprises notably a second identification of links between a source object, belonging to the export subset and a destination object not belonging to the export set.

The export method can be interrupted if at least one of the selected data is already reserved in the database.

The import method can be interrupted if, after verification, at least one of the modifications performed is not feasible in the database.

The invention has notably the main advantage of providing a generic import export method, independently of the software tool to which the import export is done.

BRIEF DESCRIPTION OF THE DRAWINGS

Other characteristics and advantages of the invention will become apparent with the aid of the description which follows, given by way of nonlimiting illustration, and in conjunction with the appended drawings which represent:

FIG. 4: an example of an XSD file, the acronym standing for the expression XML Schema Definition;

FIG. 5a: in a schematic manner, a method of exporting objects stored in the database;

FIG. 8a: various possible steps of a method of importing modified objects into the database, in a schematic manner;

DETAILED DESCRIPTION

Figure 1:
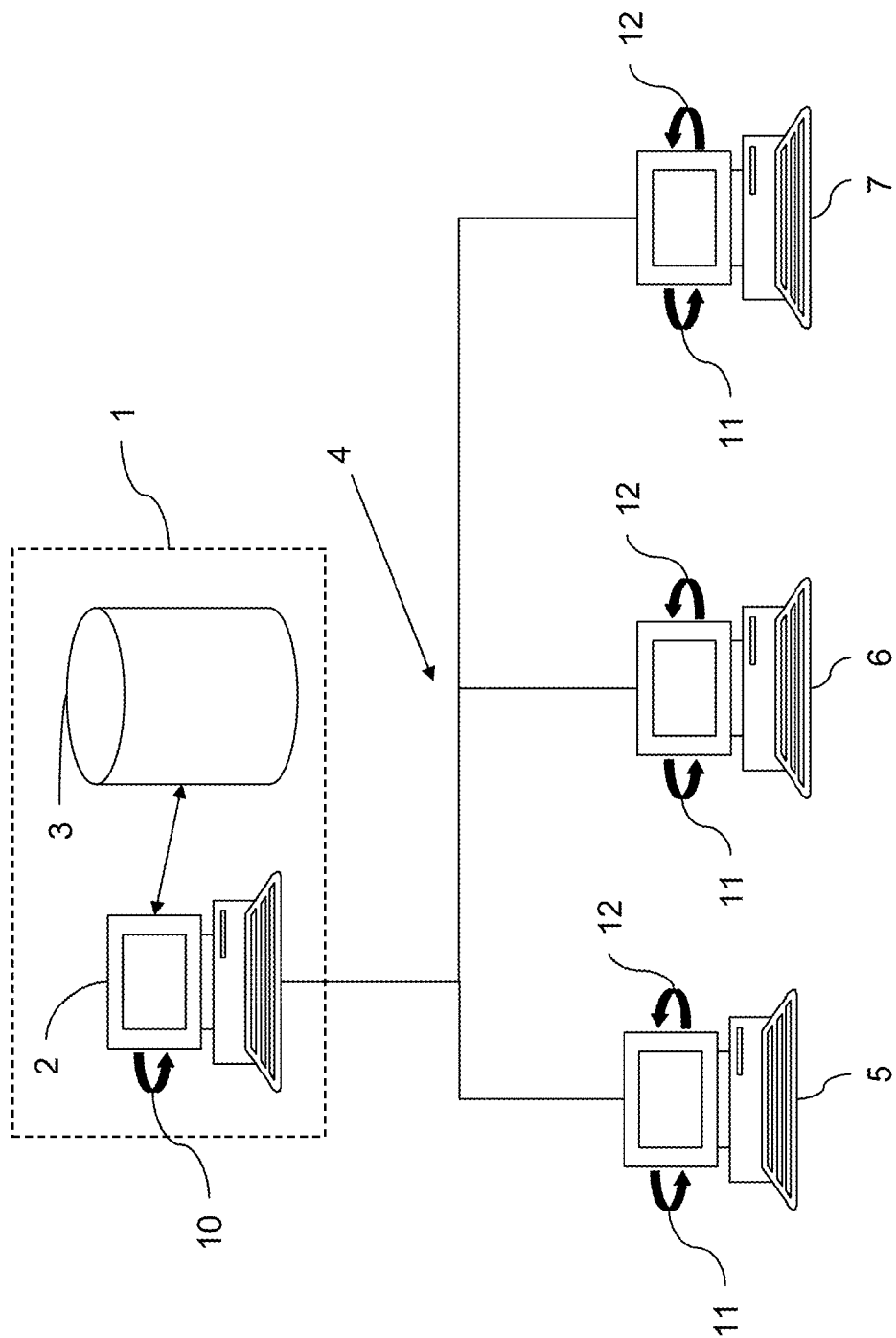
FIG. 1: a schematic example of a client-server architecture for access to data stored in a database.

FIG. 1 presents an example of a schematic representation of a client-server architecture for access to data stored in a database 1. A client-server architecture of a database 1 comprises notably a database 1 server 2. The server 2 is a first computer 2 comprising at least one processor on which a first software application 10 for managing the database 1 executes. The server 2 manages one or more hard disks 3 of the database 1. On the hard disks 3 are stored the data of the database 1. The first computer 2 allows clients 5, 6, 7 connected by a network 4 to the database 1, to gain access to the database 1. The clients are for example second computers 5, 6, 7. Each second computer 5, 6, 7 comprises at least one processor on which several different applications 11, 12 can execute. The various applications 11, 12 can access the data stored by the database 1 to view and/or to modify the data of the database. Access to the data by the applications 11, 12 is achieved by way of the processors of the second computers 5, 6, 7. Indeed, the processors of the second computers 5, 6, 7 exchange data of the database 1 with the processor of the first computer 2 by way of the network 4. There may therefore exist accesses to the database 1, as well as modifications of the data, performed concurrently and simultaneously by several users of the database 1. The applications 11, 12 can notably be software tools 11 for analysis and design of an avionics system, for example. The analysis and design tools 11 manipulate notably formal data relating to hardware and/or software system engineering. Applications 12 performed on the second computers 5, 6, 7 can be third applications 12 serving as interface between a user and the first application 10 for managing the database 1.

Accesses to the data of the database by the client computers 5, 6, 7 are achieved by way:
- of export methods for fetching the data of the database 1 to the computers 5, 6, 7;
- of import methods for placing the data originating from the computers 5, 6, 7 in the database 1.

Thus data exported previously from the database 1 can be modified by an application 11, 12 and then imported into the database 1. The importation, into the database 1, of the modified data allows the data stored in the database 1 to be updated. Data can also be added or deleted in the database 1, the import method allowing the data stored in the database 1 to be updated, while taking into account notably the additions, deletions, modifications of data.

Figure 2:
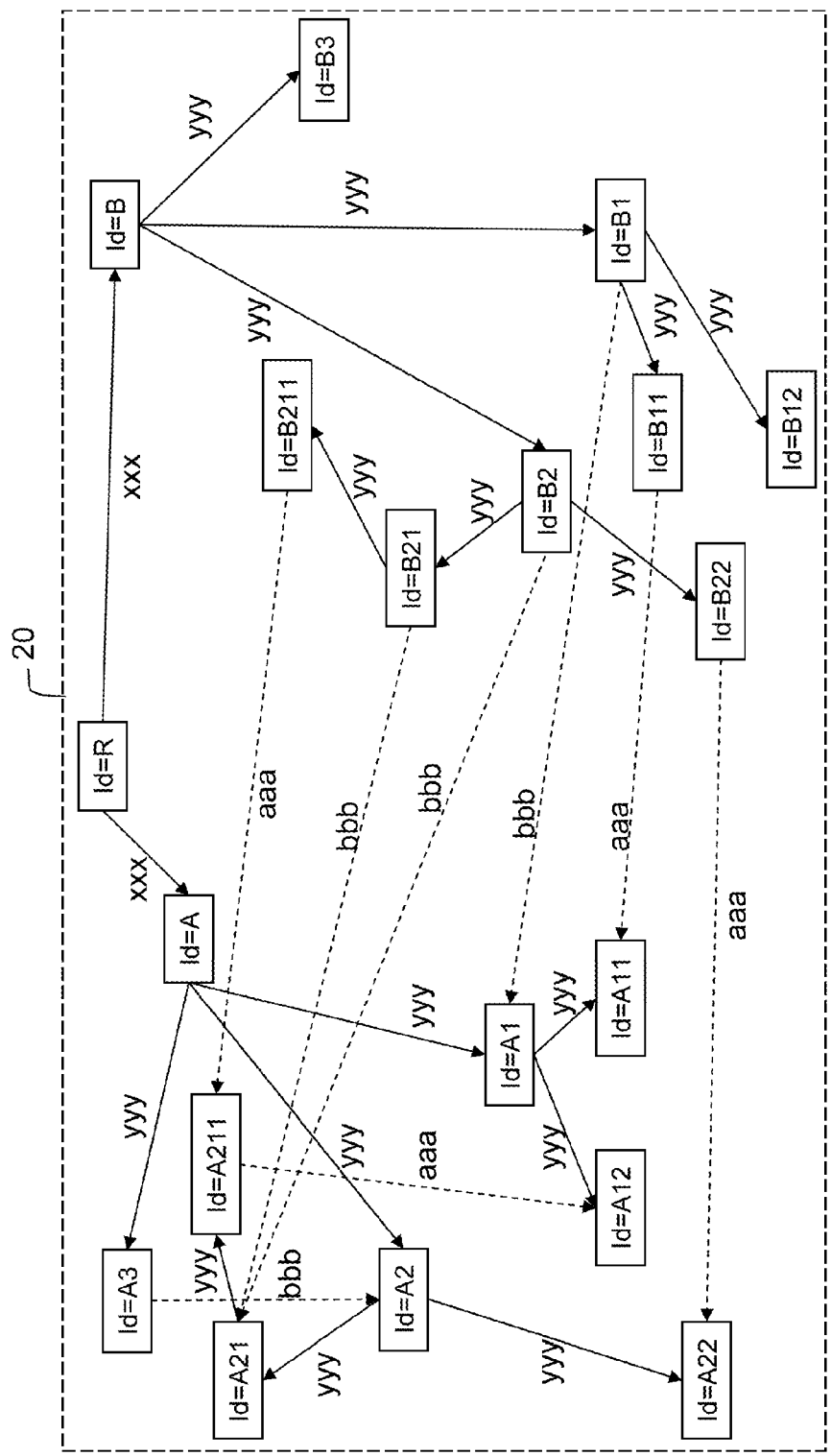
FIG. 2: an example of a representation of a data set stored in the form of objects in the database.

FIG. 2 represents an example of a data set 20 stored in the form of objects in the database 1. This data set can be represented in the form of a data model 20 defining each object stored in the database as well as links existing between each object of the database 1. Each object is identified by an identifier Id which can equal: R, A, A1, A11, A12, A2, A21, A211, A22, A3, B, B1, B11, B12, B2, B21, B211, B22, B3. The objects R, A, A1, A11, A12, A2, A21, A211, A22, A3, B, B1, B1, B12, B2, B21, B211, B22, B3 can be linked pairwise by links xxx, yyy, aaa, bbb. The links xxx, yyy, aaa, bbb can define composition relationships xxx, yyy, or reference relationships aaa, bbb. The composition links, or relationships, xxx, yyy define at one and the same time the tie, but also the type of the destination object of the composition tie. For example:
- a first tie xxx is a composition tie linking a first object R, of a first type of object Root, the source of the composition, to an object of second type XXXType, for example a second object A or a third object B;
- a second composition tie yyy represents a tie between, for example, the third object B and a ninth object B3 of a third type of object YYYType.

A source object of a composition tie xxx, yyy to another destination object of the composition tie xxx, yyy is dubbed a parent object, the destination object then being a child object. For example the first object R is a parent object for two child objects the second object A and the third object B. The reference links, or relationships, aaa, bbb represent for example two of references: a first reference aaa, a second reference bbb.

Thus in the example represented in FIG. 2:
- the first object R has a composition tie to the second object A of second type XXXType and a composition tie to the third object B of second type XXXType;
- the second object A has three composition links to following objects of third type YYYType: a fourth object A1, a fifth object A2, a sixth object A3;
- the third object B has three composition links to following objects of third type YYYType: a seventh object B1, an eighth object B2, a ninth object B3;
- the fourth object A1 has two composition links to following objects of third type YYYType: a tenth object A11, an eleventh object A12;
- the fifth object A2 has two composition links to following objects of third type YYYType: a twelfth object A21, a thirteenth object A22;
- the sixth object A3 has a second reference tie bbb to the fifth object A2;
- the seventh object B1 has two composition links to following objects of third type YYYType: a fourteenth object B11, a fifteenth object B12, and a second reference tie bbb to the fourth object A1;
- the eighth object B2 has two composition links to following objects of third type YYYType: a sixteenth object B21, a seventeenth object B22, and a second reference tie bbb to an object: the twelfth object A21;
- the twelfth object A21 has a composition tie to an object of third type YYYType: an eighteenth object A211;
- the fourteenth object B11 has a first reference tie aaa to the tenth object A11;
- the sixteenth object B21 has a composition tie to an object of third type YYYType: a nineteenth object B211, and a second reference tie bbb to the twelfth object A21;
- the seventeenth object B22 has a first reference tie aaa to the thirteenth object A22;
- the eighteenth object A211 has a first reference tie aaa to the eleventh object A12;
- the nineteenth object B211 has a first reference tie aaa to the eighteenth object A211.

Figure 3:
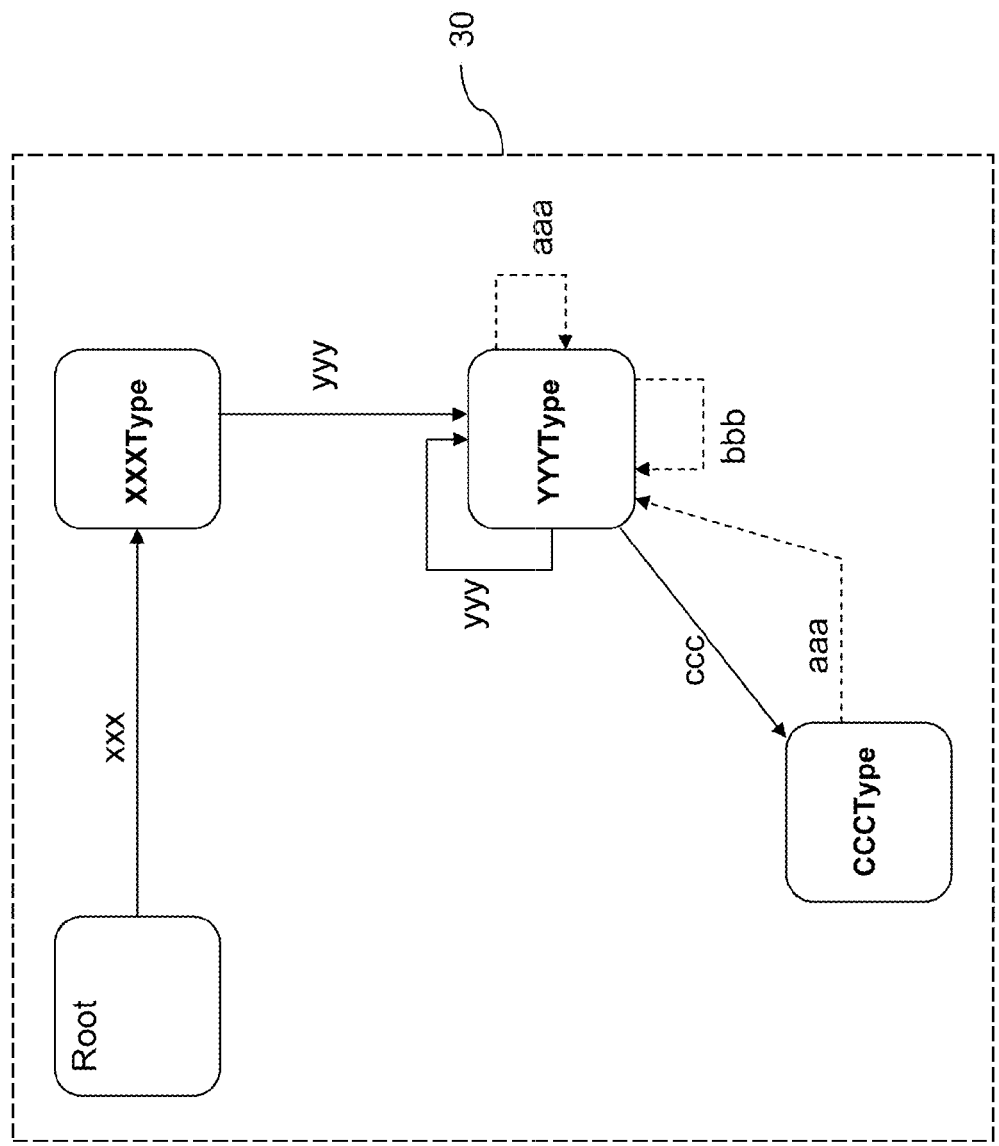
FIG. 3: an example of a meta-model for the set of objects stored in the database.

FIG. 3 represents an example of a meta-model 30 for a set of objects stored in a database 1. The meta-model 30 is a model defining a grammar which makes it possible to describe possible interactions between the various types of objects of the database 1. The meta-model 30 makes it possible notably to define links that may exist between the various types of objects of the data model 20 represented in FIG. 2, for example. The meta-model also makes it possible to describe the various attributes of each type of object. An attribute of an object can, for example, be a name, an identifier, a value.

For example, the data model 20 complies with rules of interactions between the types of objects, defined by the meta-model 30. The following interactions, or links, can be defined in the meta-model 30:
- an object of a first type Root can have a composition tie with an object of second type XXXType: such is the case notably between the first object R and the second object A represented in FIG. 2;
- an object of second type XXXType can have a composition tie with an object of the third type YYYType: for example in FIG. 2, the second object A of second type XXXType has a composition tie to a fourth object A1 of third type YYYType;
- an object of third type YYYType can have a composition tie with another object of third type YYYType: for example in FIG. 2, the fourth object A1 of third type YYYType has a composition tie to the tenth object A11 of third type YYYType;
- an object of third type YYYType can have a composition tie with another object of a fourth type CCCtype.
- An object of third type YYYType can have a first reference tie aaa to another object of the third type YYYType: for example, in FIG. 2, the fourteenth object B11 has a first reference tie aaa to the tenth object A11;
- an object of third type YYYType can also have a second reference tie bbb to another object of the third type YYYType: for example, in FIG. 2, the seventh object B1 has a second reference tie bbb to the tenth object A11;
- an object of the fourth type CCCtype can have a tie of the first type for reference aaa to another object of the third type YYYType.

The meta-model 30 therefore makes it possible to describe one or more data models such as the data model 20 represented in FIG. 2.

FIG. 4 represents an example of an XSD file 40, the acronym standing for the expression XML Schema Definition. An XSD file is a file describing a formal structure of XML files. An XSD file makes it possible notably to verify the validity of an XML file. An XSD file therefore makes it possible to describe a structure of the data contained in an XML file. An XSD file has an inherent syntax which is defined in a language named XML Schema. The import export method advantageously uses an XSD file like the XSD file 40 represented in FIG. 4. The XSD file 40 is notably defined on the basis of the meta-model 30 of the database 1. The XSD file 40 therefore describes in an inherent formalism the meta-model 30 represented in FIG. 3. The XSD file thereafter makes it possible to generate XML files comprising a description of the objects of the database 1, according to a formalism inherent to the files of XML type.

The XSD file 40 comprises notably: a type of a root object 41 of the meta-model 30; a list 42 of types of objects of the meta-model 30.

A root object 41, by definition, does not comprise any parent in the data model 20 and all the objects of the data model 20 can be attached to it directly or indirectly, by one or more cascaded composition links. For example the object of first type Root is the root object of the meta-model 30. The root object of the data model 20 described by the meta-model 30 is the first object with name, "xsd: element name", or identifier R and of first type Root.

Each type of object is defined by the name of its type: for example "xsd: complex Type Name=Root", defines the name of the third type of object Root. Each type of object can have attributes, like an identifier, links with other objects. The links can be defined by a type of tie: composition, reference. A composition tie is for example characterized by:
- the name of the composition relationship, for example "xsd:element name=xxx" for the composition relationship xxx;
- the type of the destination object of the composition, for example "type=XXXType" for the first type of object XXXType;
- a cardinality of the composition relationship, defined by a minimum occurrence index, "minOccurs" and a maximum occurrence index, "maxOccurs".

A maximum occurrence index "maxOccurs=unbounded" signifies that the maximum occurrence number is undefined, or unlimited.

A reference tie can be characterized by:
the name of the reference, for example "xsd:element name=aaa" for a reference which is named aaa;
the type of tie, for example "type=xsd:anyURI>> signifies that the tie is of reference type;
a cardinality of the reference relationship, defined by a minimum occurrence index, "minOccurs" and a maximum occurrence index, "maxOccurs".

An attribute can be defined by:
a name, for example <<xsd:attribute name=Id>> designates an attribute with name Id;
a type, for example "type=xsd:ID" defines an attribute of identifier type;
a use, for example "uses=required" signifies that the attribute is compulsory for the type of object to which it belongs.

In the example represented in FIG. 4, all the types of objects have an attribute of identifier type with name Id.

The XSD file 40 makes it possible notably to describe the following types of objects.

A first description of type of object 43 describes the third type of object Root. An object of the first type Root comprises a first composition tie to an object of the second type XXXType. The first composition tie is defined by the name of the relationship xxx, by the type of the object of second type forming part of the composition: XXXType, as well as by a cardinality from zero to unlimited. This signifies that there may be a composition between an object of first type Root and no, one or more objects of second type XXXType.

A second description of type of object 44 describes the second type of object XXXType. An object of the second type of object XXXType comprises a second composition tie yyy to an object of the third type YYYType. The second composition tie is defined by the name of the relationship: yyy, by the type of the object of third type forming part of the composition: YYYType, as well as by a cardinality from zero to unlimited. This signifies that there may be a composition between an object of second type XXXType and no, one or more objects of third type YYYType.

A third description of type of object 45 describes the third type of object YYYType. An object of the third type of object YYYType comprises composition links and reference links, including notably:
a third composition tie to an object of the second type YYYType. The third composition tie is defined by the name of the relationship: yyy, by the type of the object of third type YYYType which is the destination of the composition, as well as, by a cardinality from zero to unlimited; this signifies that there may be a composition between an object of third type YYYType and no, one or more objects of third type YYYType.
a fourth composition tie to an object of the fourth type CCCType. The fourth composition tie is defined by the name of the relationship: ccc, by the type of the object of fourth type CCCType which is the destination of the composition, as well as by a cardinality from zero to unlimited; this signifies that there may be a composition between an object of third type YYYType and no, one or more objects of fourth type CCCType;
a first name reference tie aaa. The first reference tie is defined by the name of the relationship: aaa, as well as by a cardinality from zero to unlimited; This signifies that there may be no, one or more references between an object of third type YYYType and no, one or more objects.
a second name reference tie bbb. The second reference tie is defined by the name of the relationship bbb, as well as by a cardinality from zero to unlimited; this signifies that there may be no, one or more references between an object of third type YYYType and no, one or more objects.

A fourth description of type of object 46 describes the fourth type of object CCCType. An object of the fourth type of object CCCType comprises a third reference tie defined by the name of the reference: aaa, as well as by a cardinality from zero to unlimited; this signifies that there may be no, one or more references between an object of fourth type CCCType and no, one or more objects.

Figure 5B:
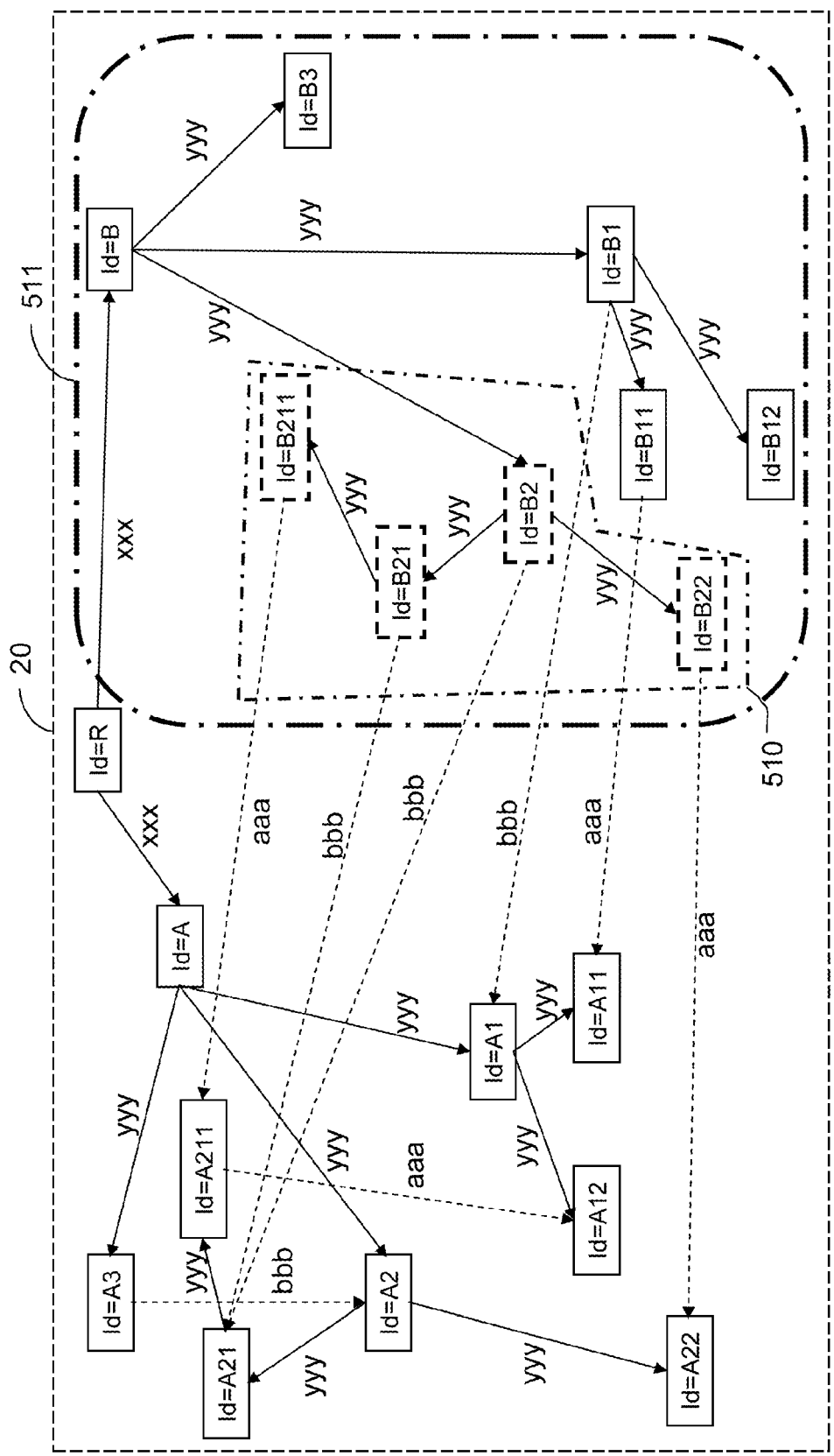
FIG. 5b: in a schematic manner, a reservation of objects by a first user of the database.

FIGS. 5a, 5b schematically represent various possible steps of a method of exporting objects stored in the database 1, according to the invention. When a user, of a second software application 12 performed on a second computer 5, 6, 7 represented in FIG. 1, wishes to modify, by way of the second software application 12 data of the database 1, he can call upon an export method 50 to export the data of the database 1. A data export method 50 makes it possible to load into memory of a second computer 5, 6, 7, represented in FIG. 1 for example, part or the entirety of the data of the database 1. The data loaded into memory can thereafter be displayed by the second software application 11. The second software application 11 can also provide the user with means for modifying the data loaded into memory.

The export method 50 can be carried out in part by a software component forming part of the first software application 10 for managing the database 1, for example.

A first step 51 of the export method 50 can be a step of specification 51, by a user, of a set of objects 510 that he wishes to be able to modify. The specification 51 can be made by selecting a set of objects of the database 1, that the user wishes to be able to modify. The set of modifiable objects 510 is a subset of the set of objects 20 of the database 1, which are represented in FIG. 5b. The subset of objects 510 can be named modifiable export subset 510. In FIG. 5b, the modifiable export subset 510 is for example composed of the following objects: the nineteenth object B211, the sixteenth object B21, the eighth object B2, the seventeenth object B22. Selection of the modifiable export subset 510 can be performed on the basis of the second software application 11 or of a third application 12 serving as interface between the user and the server 2 of the database 1.

Once the modifiable export subset 510 has been selected, the user can request read export of the data contained in the export subset 511 in the course of a second step 52 of the export method 50. The export request can be made by way of a request dispatched from the second application serving as interface 11 between the user and the server 2 and the first application for managing the database 10.

A third step 53 of the export method 50 can be a verification step 53 for checking that the modifiable export subset 510 does not comprise any objects reserved in the database 1. Indeed, as soon as a data export has been carried out, the modifiable objects are marked in the database with a marker specifying that they are reserved. An object remains thus reserved until it has formed the subject of an import method for importing into the database. The import method is described subsequently in greater detail. The verification 53 can be carried out by the software component 10 managing the export method 50, performed on the database server 1. When one of the objects of the modifiable export subset 510 is already reserved in the database 1, the export method 50 stops. For example the server 2 can dispatch, to the third interface application 12, an error message signalling that one or more of the objects of the modifiable export subset 510 is reserved. The error message can for example mention the identifiers of the objects already reserved in the database 1. Thus the user can resume the first step 51 of the export method 50 so as to specify a new subset of modifiable objects 510.

When none of the objects of the modifiable export subset 510 is already reserved in the database 1, the export method 50 can continue with a fourth step 54 of constructing an export set 511. In another embodiment of the export method, it may be possible to export only the objects which are not already reserved in the database 1.

The export of objects of the export set 511, is performed from the database 1 to the computer 5, 6, 7 of the user. An export set 511 is notably composed of the objects B2, B21, B22, B211 of the modifiable export subset 510. The software component managing the export constructs, when it receives the export subset 511, an export set 511 comprising notably:
- a root object B of the export subset 511;
- a set of the child objects of the root object B of the export subset 511;
- a set of reference links of the objects of the export set 511.

The root object B is determined, by the software component managing the export for example, by browsing the data model 20 from each modifiable object B2, B21, B22, B211, via the composition links for compounding the objects, starting from the child objects and ascending back up to the root parent object B of the objects of the modifiable export subset 510. The root object B of the export subset 510 is the first parent object common to the objects of the export subset 510, encountered in during the traversal of the data model 20 from child to parent on the basis of the objects of the modifiable export subset 510. For example, in FIG. 5a, the root object of the modifiable export subset 510 is the third object B. Indeed, starting from the nineteenth object B211 of the export subset 510, the parent object of the nineteenth object B211 is the sixteenth object B21 which itself forms part of the modifiable export subset 510. The parent object of the sixteenth object B21 is the eighth object B2 which itself forms part of the export subset 510. The parent object of the eighth object B2 is the third object B which, in this case, does not form part of the modifiable export subset 510. It remains to ascertain whether the third object B is the root object of the export subset 510. The only object of the modifiable export subset 510 which has not been traversed is the seventeenth object B22. The parent object of the seventeenth object is the eighth object B2, which has already been traversed, so as to culminate at the third object B. The third object B is indeed therefore the root object of the modifiable export subset 510.

The set of child objects of the root object B of the modifiable export subset 510 is composed of all the children of the objects descending from the root object B of the export subset 510. A descendant of the root object B is a child of a descendant of the root object. The first descendant of the root object B is a child of the root object B. For example in FIG. 5a, the set of child objects of the root object B comprises the objects B2, B21, B22, B211 of the modifiable export subset 510 as well as the other descendants of the root object B of the export subset 511, that is to say the objects descending from the third object B: the seventh object B1, the ninth object B3, the fourteenth object B11, the fifteenth object B12.

The set of reference links of the objects B1, B2, B3, B11, B12, B21, B22, B211, from the export set 511 to other objects, is for example represented in FIG. 5b by a set of chain-dotted lines starting from the objects B1, B2, B3, B11, B12, B21, B22, B211 of the export set 511 and going to other objects of the data model 20. The set of reference links comprises for example:
- a first reference tie from the nineteenth object B211 to the eighteenth object A211;
- a second reference tie from the sixteenth object B21 to the twelfth object A21;
- a third reference tie from the seventh object B1 to the fourth object A1;
- a fourth reference tie from the fourteenth object B11 to the tenth object A11;
- a fifth reference tie from the seventeenth object B22 to the thirteenth object A22.

A fifth step 55 of the export method 50 can be a step of marking as "reserved" the objects B2, B22, B21, B211 of the export subset 511. The fourth step of marking 55 the objects of the export subset 511 can be carried out by the software component managing the export method 50. The fourth marking step 55 is a step of reserving the objects of the database which will then be able to be modified only by the instigator of the marking.

Figure 6:
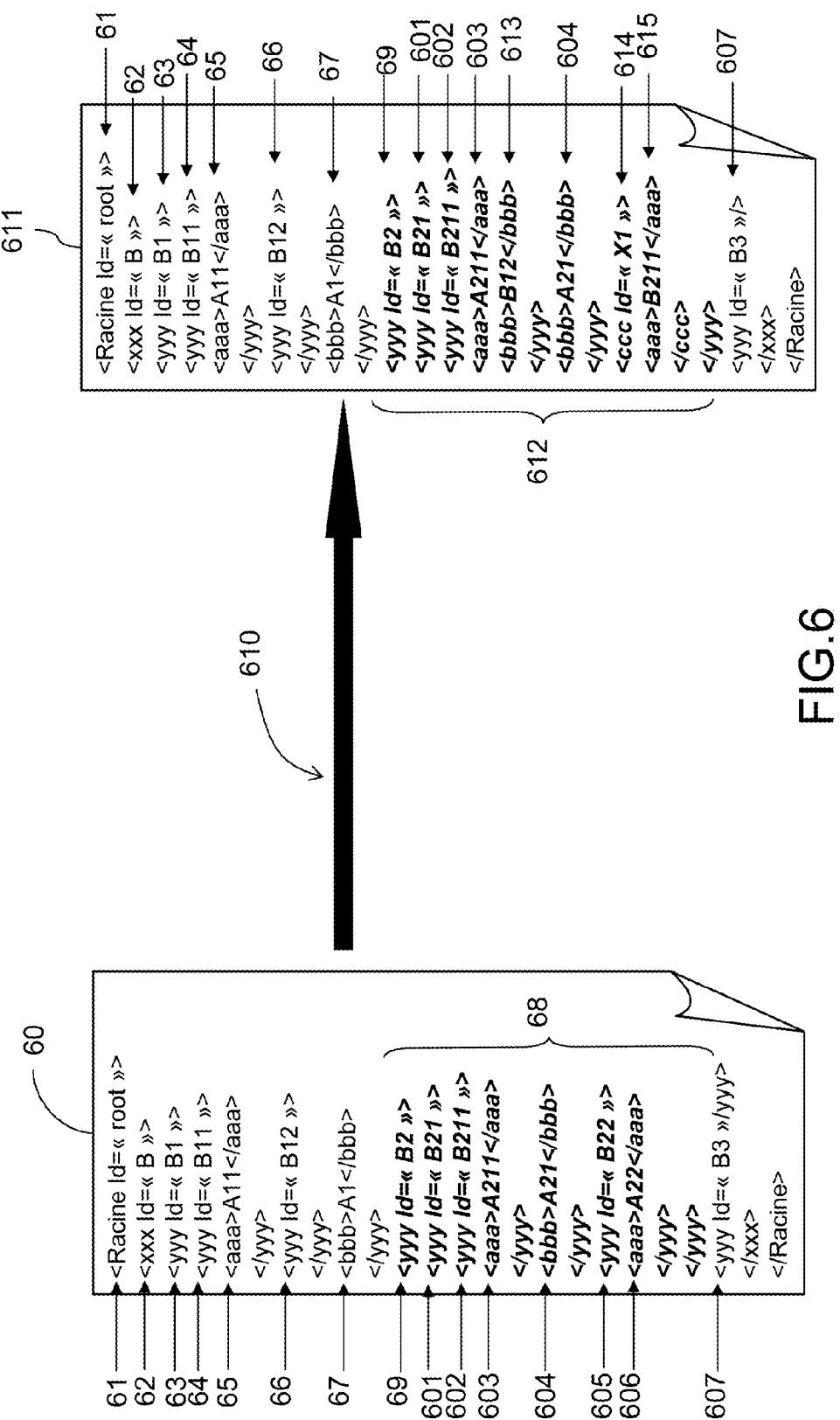
FIG. 6: an example of modification of the objects by the first user by way of an XML file.

A sixth step 56 of the export method 50 can be a step for generating a first XML file 60 such as represented in FIG. 6, for example. The generation of the first XML file 60 can be done for example by the first application 10 for managing the database 1. The first XML file 60 comprises notably the description of the objects and links of the export set 511. The generation of the first XML file is performed according to the grammar described in the XSD file 40.

Thus a first element 61 of the first XML file 60 is the root object R of the data model 20. The first XML file 60 is thereafter described by browsing the composition links for compounding the objects of the data model 20, from parent to child, while also describing for each object its references to other objects. Each object is preceded in the first XML file 60 by its type. The first object R has notably as child in the export set 511 the third object B, also root object of the export set 511.

A second element 62 of the first XML file 60 is therefore the third object B. The third object B has three children in the export set 511: the seventh object B1, the eighth object B2 and the ninth object B3.

A third element 63 of the first XML file 60 is the seventh object B1. The seventh object B1 has in the data model 20 two children: the fourteenth object B11 and the fifteenth object B12.

A fourth element 64 of the first XML file 60 is the fourteenth object B11. The fourteenth object B11 has a reference of first type of reference aaa to the tenth object A11.

A fifth element 65 of the first XML file 60 is therefore the reference of first type of reference aaa of the fourteenth object B11 to the tenth object A11.

Thereafter, the fourteenth object B11 not having any child in the composition sense, a sixth element 66 of the first XML file 60 is the fifteenth object B12, the child of the seventh object B1.

The fifteenth object B12 not having any child in the database 1, a seventh element 67 of the first XML file 60 is the reference of second type bbb from the seventh object B1 to the fourth object A1.

Thus each object of the export set 511 is described by specifying in a recursive manner, first of all its children, the children of its children and finally, its references.

The first XML file 60 comprises in the same manner as previously a description 68 of the objects B2, B21, B211, B22 of the export subset 510 of their composition links and of their references, comprising notably the following elements:
- an eighth element 69 of the first XML file 60 is the eighth object B2, root object of the export subset 510, and child object of the third object B;
- a ninth element 601 of the first XML file 60 is the sixteenth object B21, child of the eighth object B2;

a tenth element 602 of the first XML file 60 is the nineteenth object B211, child of the sixteenth object B21;

an eleventh element 603 of the first XML file 60 is a reference of the first type of reference aaa between the nineteenth object B211 and the eighteenth object A211;

a twelfth element 604 of the first XML file 60 is a reference of the second type of reference bbb between the eighth object B2 and the twelfth object A21;

a thirteenth element 605 of the first XML file 60 is the seventeenth object B22;

a fourteenth element 606 of the first XML file 60 is a reference of the first type of reference aaa between the seventeenth object A22 and the thirteenth object A22;

a fifteenth element 607 of the first XML file 60 is the ninth object B3, the said ninth object B3 not forming part of the export subset 510 but forming part of the export set 511.

The first XML file 60 thus defined makes it possible to export the data of the export set 511 to another computer 5, 6, 7 from the database. The first XML file 60 is therefore transferred, in the course of a seventh step 57, from the first computer, by way of the network 4, to a second computer 5, 6, 7 on which it can be utilized by applications 11, 12. The second application 11, using the data of the export set 511, can reconstruct a data model comprising the objects that the user wishes to be able to modify or simply view.

FIG. 6 represents modifications performed by a first user having carried out a data export 50 from the database 1. The first user can for example modify an object, a tie, destroy an object, a tie to another object, for the objects reserved in the database 1.

A first modification can be a destruction or a deletion of an object for example the seventeenth object B22. The deletion of the object B22 gives rise to the deletion of the references that it comprises and notably of the reference of second type aaa to the thirteenth object A22. The deletion of the object B22 also gives rise to the deletion of the composition tie of second type yyy between the eighth object B2 and the deleted seventeenth object B22.

A second modification can be a creation of a twentieth object X1 of fourth type ccc. The twentieth object X1 can be the child of the eighth object B2.

A third modification can be a creation of a tie of the first type of reference aaa between the twentieth object X1 and the nineteenth object B211.

A fourth modification can be a creation of another tie of the second type of reference bbb between the nineteenth object B211 and the fifteenth object B12.

The modifications performed on the data model 20 and particularly on the export subset 510.

The modifications can be taken into account by the second application 11 using the data of the data model 20, for example, or by the third interface application 12. The modifications previously described can be taken into account by way of a modification 610 of the first XML file 60. A second XML file 611 is for example the result of taking the modifications into account.

For example, taking account of the modifications in the second XML file 611 can lead to performing:

a deletion of the thirteenth element 605 of the first XML file 60 following the deletion of the seventeenth object B22;

a deletion of the fourteenth element 606 of the first XML file 60 following the deletion of the reference tie of second type aaa from the seventeenth object B22 to the thirteenth object A22;

an addition of a sixteenth element 613 in the second XML file 611 after the eleventh element 603 of the first XML file 60, following the creation of a tie of the second type of reference bbb between the nineteenth object B211 and the fifteenth object B12;

an addition of a seventeenth element 614 in the second XML file 611, following the addition of the twentieth object X1, child of the eighth object B2; the seventeenth element 614 is added following the twelfth element 604 according to the principle of constructing the XML file stated previously;

an addition of an eighteenth element 615 in the second XML file 611, following the creation of the reference tie of first type of reference aaa between the twentieth object X1 and the nineteenth object B211.

The second XML file 611, thus constructed, allows an import of the modifications performed on the objects in the database 1 according to a method defined subsequently.

Figure 7A:
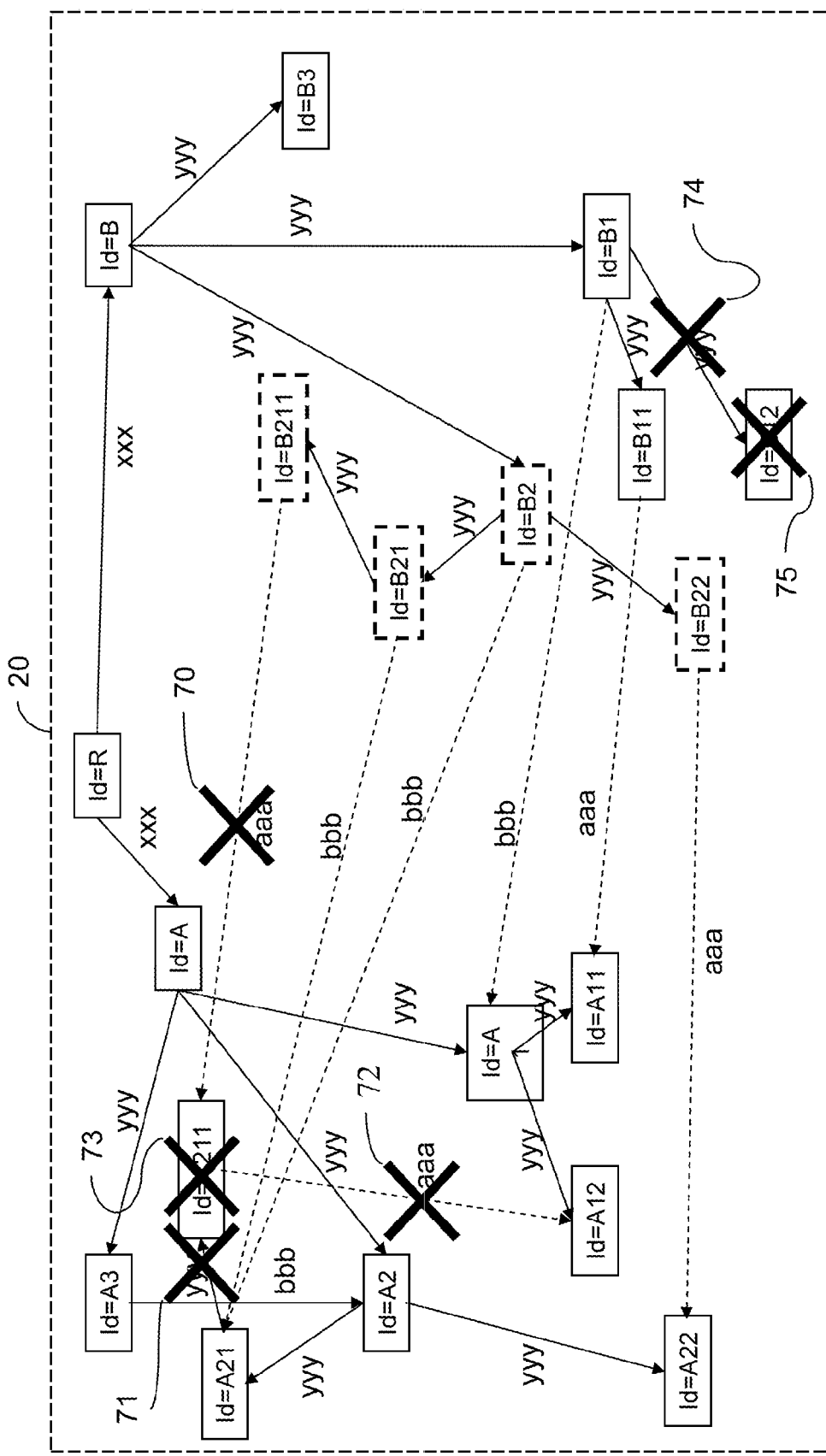
FIG. 7a: an example of modifications performed on the objects by a second user of the database.
Figure 7B:
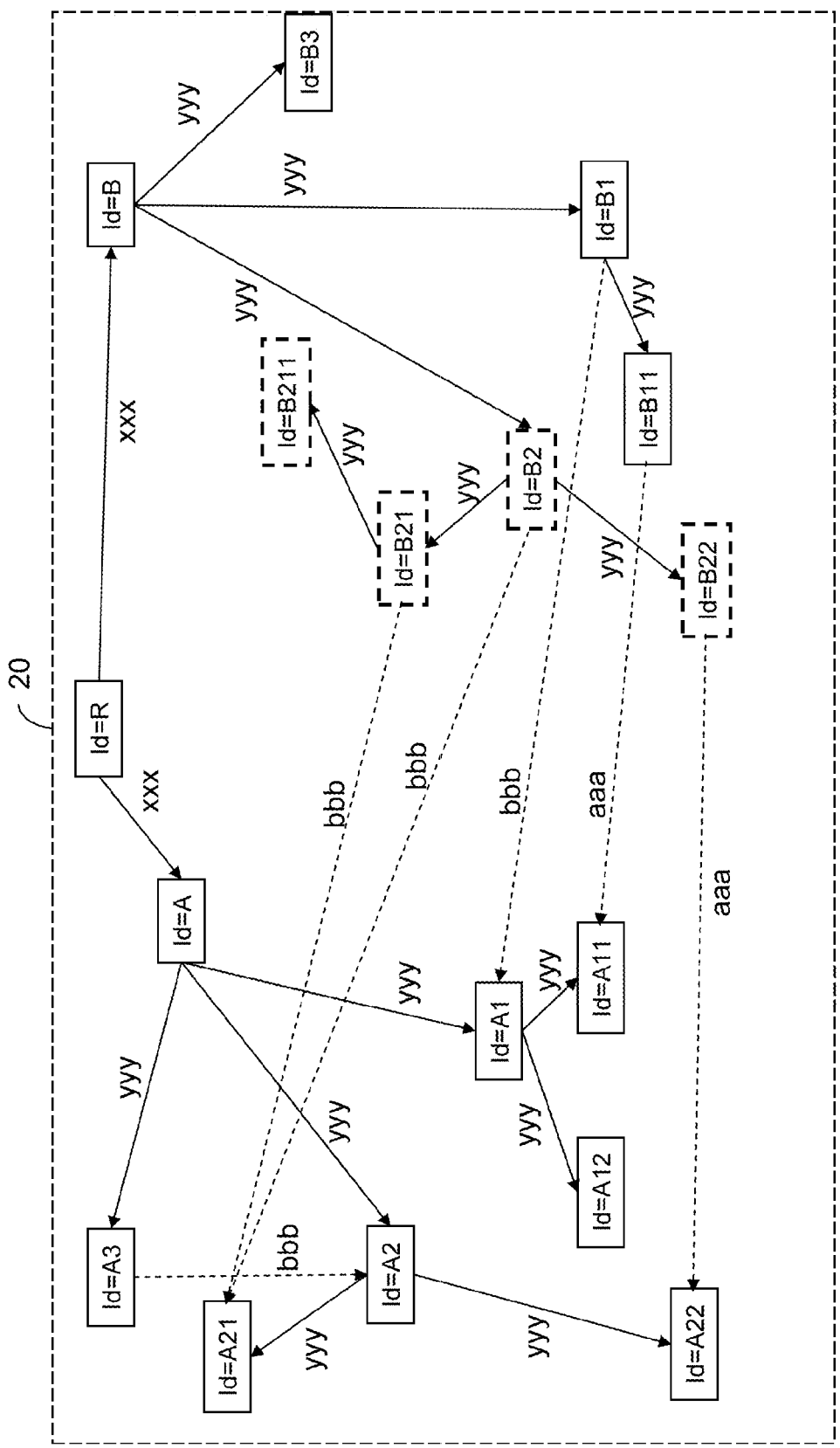
FIG. 7b: the objects of the database after the modifications performed by the second user.

FIGS. 7a, 7b represent an example of modifications performed on the objects of the data model 20 by a second user of the database 1. A second user can, indeed, modify the object model 20 of the database in a concurrent manner with the first user. Thus the second user can modify the objects of the data model 20 which have not previously been reserved by the first user. This modification by the second user can be done by way of an import export method according to the invention or by any other means.

For example the second user can perform the following modifications represented in FIG. 7a:

a first deletion 70 of the reference tie between the nineteenth object B211 and the eighteenth object A211;

a second deletion 71 of the composition tie from the twelfth object A21 to the eighteenth object A211;

a third deletion 72 of the reference tie between the eighteenth object A211 and the eleventh object A12;

a fourth deletion 73 of the eighteenth object A211;

a fifth deletion 74 of the composition tie between the seventh object B1 and the fifteenth object B12;

a sixth deletion 75 of the fifteenth object B12.

FIG. 7b represents the data model 20 once the modifications performed by the second user have been taken into account at the level of the database 1.

Figure 8B:
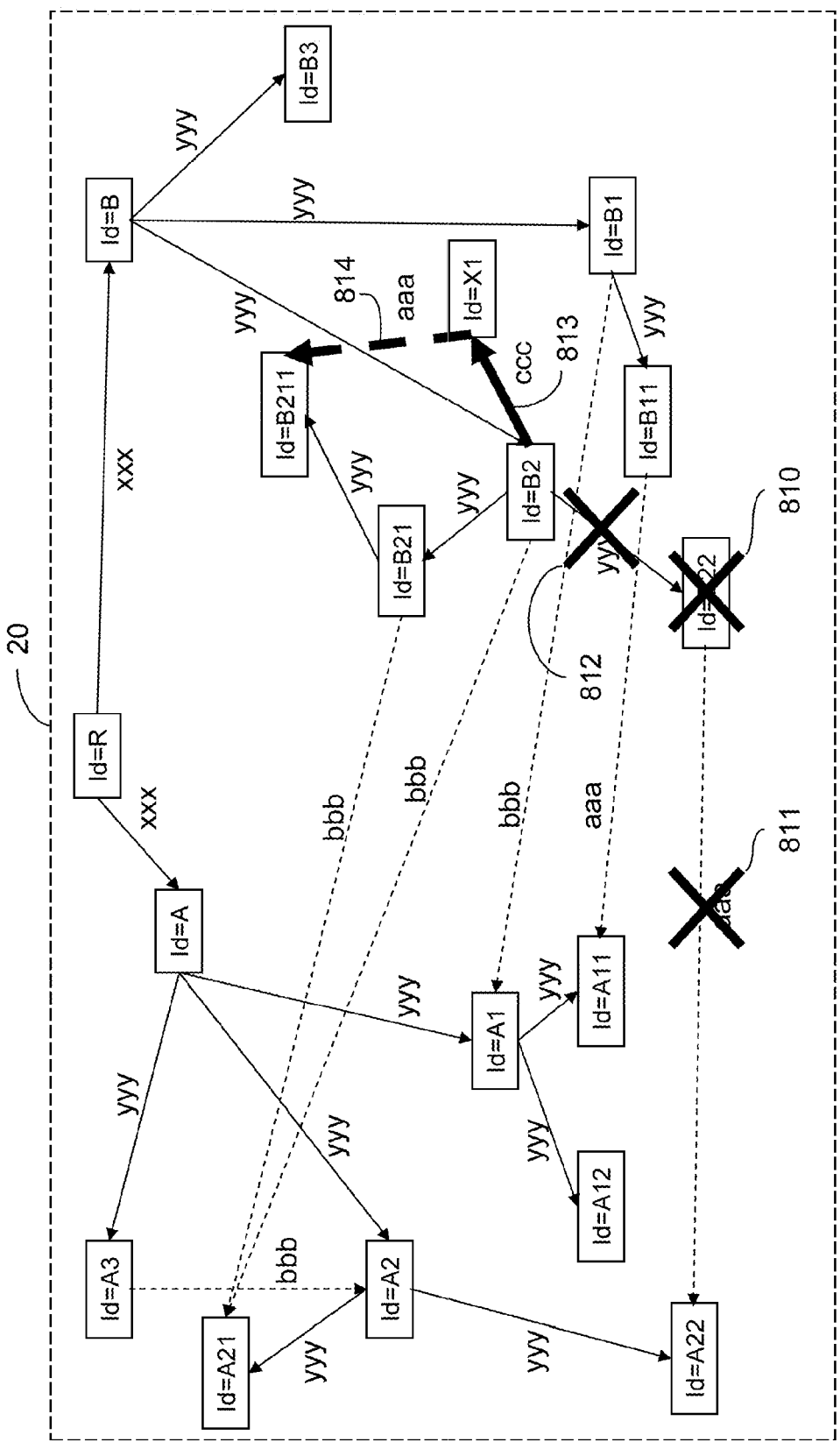
FIG. 8b: modifications performed by the first user on the set of objects of the database.
Figure 8C:
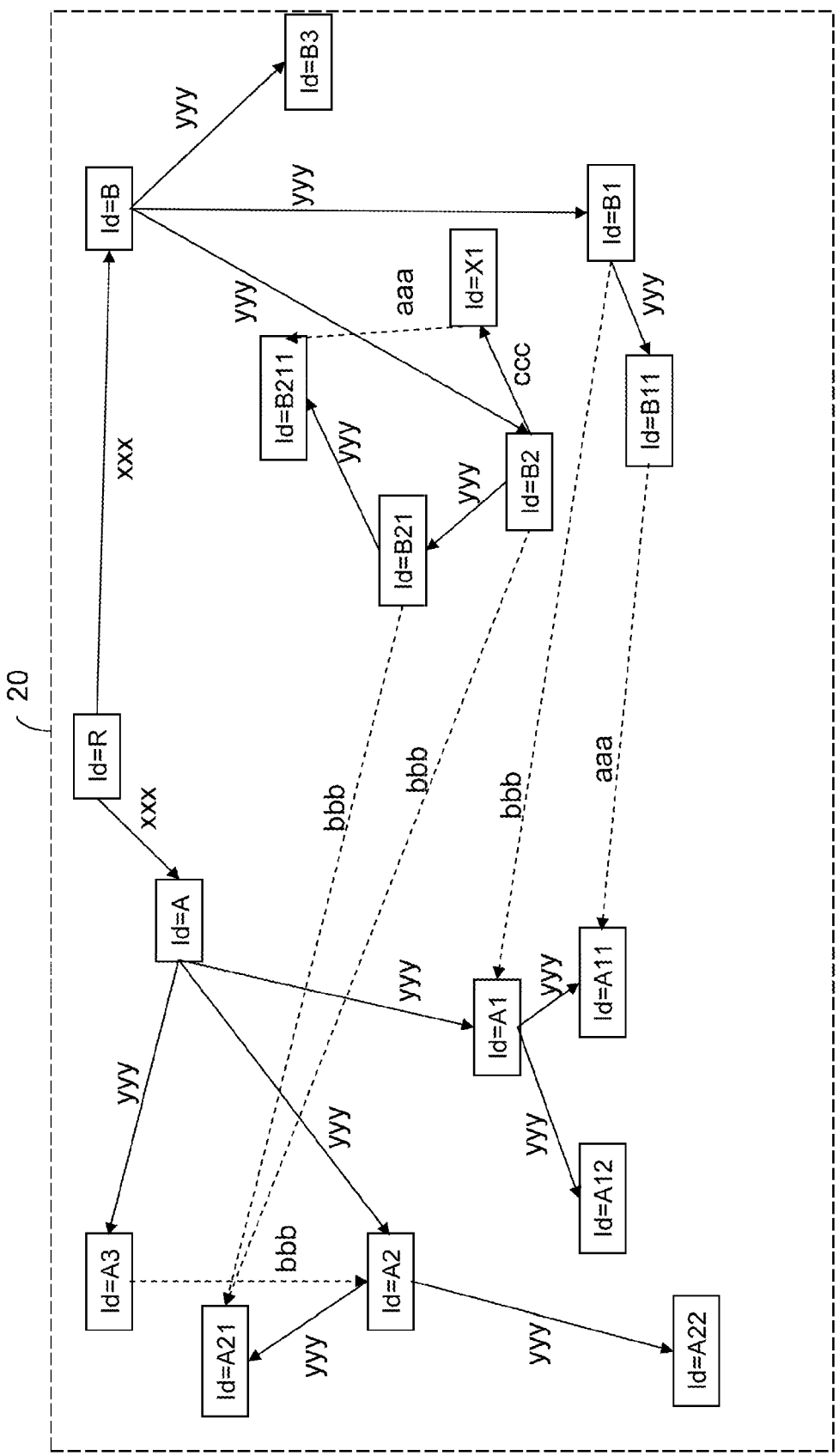
FIG. 8c: the set of objects of the database after the modifications performed by the first user.

FIGS. 8a, 8b, 8c represent various possible steps of a method 80 of importing objects stored in the database 1, according to the invention. The data of the data model 20, once modified by the first user and such as represented in FIG. 8c, can be imported into the database 1. This import makes it possible to update the data contained in the database 1. The updating of the data model 20 in the database 1 makes it possible to make the modifications performed by the first user available to all the other users.

A first step 82 of the import method 80 can be a step of transferring the second XML file 611 of the application which created it to the first application 10 for managing the database 1. The first step 82 can be a dispatching of the second XML file 611 to the server 2 which will deal with all the following steps while making the checks, locally, of the server 2 between the database 1 and the second XML file 611.

A second step 83 can be a comparison step for comparing the list of authorized objects under modification in the database 1, that is to say objects marked "reserved" in the database 1, with the objects described in the second XML file 611. The comparison can be performed with the aid of the identifiers of the objects of the data model 20. This comparison step makes it possible to establish a list of the objects destroyed by the first user and present in the database 1.

A third step 84 can be a step of identifying links of the data model 20 whose destination is an object identified as destroyed in the course of the previous second step 83 and whose source is an object not belonging to the import subset 510. This third step of identification 84 makes it possible to determine a first impact of the modifications performed by the first user on the objects of the database 1: for example, in FIG. 8b the modifications made by importing the modifications of the first user with respect to a state of the data model 20 such as represented in FIG. 7b, while taking into account the modifications performed by a second user. In FIG. 8b, a first destruction 810 of the seventeenth object B22 of the database 1, is represented. The first destruction 810 of the seventeenth object B22 gives rise to a second destruction 811 of the reference tie between the seventeenth object B22 and the thirteenth object A22. The destruction 810 of the seventeenth object B22 also gives rise to a third destruction 812 of the composition tie existing between the eighth object B2 and the seventeenth object B22. The first impact of the modifications on the data model 20 can be presented to the first user performing the import by way of the third interface application 12. The first user can then abandon the importing of the data if he does not wish to perform the destructions identified in the first impact. Should the import be abandoned, the data model 20 remains such as represented in FIG. 7b in the database 1. The modifications performed by the first user are then not taken into account in the data model 20. The third step 84 of the method of importing data according to the invention is a first verification of the consistency of the data model 20, stored in the database 1, with the modifications that one wishes to import into the database 1.

If the first user wishes to continue the import, a second verification can be performed in the course of a fourth step 85 of the import method 80 according to the invention. The fourth step 85 can be a step of verifying the feasibility of links, for example, created by the first user, or existing, as a function of the state of the data model 20 such as represented in FIG. 7b. The second verification makes it possible to identify the links whose source is an object marked "reserved" in the database 1, and whose destination is an object destroyed in the database 1, not belonging to the export set 511. The object can be for example destroyed by the modifications made by the second user. For example, in FIG. 8b, a tie between the nineteenth object B211 and the eighteenth object A211 may not be maintained on account of the destruction of the eighteenth object A211. The tie created by the first user between the nineteenth object B211 and the fifteenth object B12 is impossible to create on account of the destruction of the fifteenth object B12 of the data model 20 such as represented in FIG. 7b. The second verification can be performed by the first application 10 for managing the database 20 for example. The results of the second verification can be presented to the first user by way of the third interface application 12 between the server 2 and the second computer 5, 6, 7. In the course of the fourth step 85, the first user may or may not decide to abandon the import of the modifications that he has performed. If the first user decides to abandon his modifications, the data model 20 remains in the state represented in FIG. 7b.

If the first user decides to undertake the modifications following the second verification, a fifth step 86 of the import method 80 can be a step of destroying the links and objects identified as deleted in the course of the first verification and of the second verification.

A sixth step 87 can be a step of modifying and creating the objects and links in accordance with the second XML file 611. Each modifiable object in the database 20 that has formed the subject of a modification is actually modified in the course of the sixth step 87 in the database 1. For example in FIG. 8b, the twentieth object X1 is added into the database 1. Likewise a first added composition tie 813 of the third type of composition ccc between the eighth object B2 and the twentieth object 20 appear in the database 1. A second added reference tie 814 of the first type of reference aaa is also added between the twentieth object X1 and the nineteenth object B211.

Once the modifications have been performed in the course of the sixth step 87, the objects marked "reserved" are de-reserved in the course of a seventh step 88, and become modifiable by another user.

The import export method according to the invention makes it possible to define a generic way of importing and exporting data via an XML file. Advantageously the present invention defines generic rules for structuring the XML file, according to an XSD file, and generic attributes of the objects stored in the database 1, allowing importation and exportation of the data independently of the application using them.

The import export method according to the invention is advantageously simple and inexpensive to carry out for various software applications, on account of its generic nature.

The invention claimed is:

1. A system for modifying a database stored on a first computer by use of a processor of a second computer, the system for modifying comprising the first computer and the second computer, wherein the first computer comprises:
 a first processor; and
 a first storage medium in communication with the first processor, the first storage medium adapted to store the database and a first software application,
 wherein the first computer is programmed with the first software application, the first software application adapted to manage the database according to an import/export method;
wherein the second computer comprises:
 a second processor; and
 a second storage medium in communication with the second processor, the second storage medium adapted to store a second software application,
 wherein the second computer is programmed with the second software application, the second software application adapted to modify the database according to the import/export method;
wherein the import/export method comprises an export method, the export method comprising the steps of:
 selecting data from the database;
 requesting export of the selected data;
 verifying that the selected data are not reserved in the database;
 constructing an export set comprising the selected data that are not reserved in the database;
 reserving the selected data not reserved in the database;
 generating a data exchange file comprising the data of the export set, the data exchange file being constructed according to a data exchange file model that describes types of data and links between the types of data in the database; and
 transferring the data exchange file to the second computer; and
wherein the import/export method further comprises an import method, the import method comprising the steps of:
 transferring a new data exchange file to the first computer, the new data exchange file comprising the data of the export set and modifications performed on the selected data by the second computer;
 comparing the selected data of the new data exchange file with the selected data present in the database, so as to identify deletions of objects performed on the selected data;

verifying logical consistency of the modifications performed on the selected data, present in the new data exchange file, with respect to the selected data present in the database;

deleting in the database links and objects identified as logically consistent to delete;

modifying the selected data in the database in accordance with the new data exchange file; and unreserving the selected data in the database.

2. The system for modifying a database according to claim 1, wherein data in the database are represented by objects, the objects organized into a data model constructed according to a data meta-model, the data meta-model describing types of objects in the database and links between the types of objects in the database.

3. The system for modifying a database according to claim 2, wherein the data exchange file and the new data exchange file each describes the types of objects and the links between the types of objects defined in the data meta-model, the links between the objects being one of reference links and composition links.

4. The system for modifying a database according to claim 3, wherein the selected data forms an export set, the export set being objects of an export subset, wherein the export set comprises:

a first root object of the export subset;

a set of objects descending from the first root object by following composition links between objects in the data model; and a set of reference links of which a source object lies in the set of objects of the export subset.

5. The system for modifying a database according to claim 4, wherein the step of generating the data exchange file comprises:

starting from the first root object, browsing the objects of the export set through the composition links between the objects and of the export set; and for each object traversed, adding a description to the data exchange file of the attributes of the object and reference links that are linked to the object as a source.

6. The system for modifying a database according to claim 4, wherein the step of verifying the logical consistency comprises the step of:

identifying, for a first identification, links between a source object that does not belong to the export set and a destination object that is deleted from the export subset.

7. The system for modifying a database according to claim 6, wherein the step of verifying the logical consistency comprises the step of:

identifying, for a second identification, links between a source object that belongs to the export subset and a destination object that does not belonging to the export set.

8. The system for modifying a database according to claim 1, wherein the export method further comprises the step of interrupting the export method if at least one of the selected data is already reserved in the database.

9. The system for modifying a database according to claim 1, wherein the import method further comprises the step of interrupting the import method if, after the step of verifying the logical consistency of the modifications, at least one of the modifications performed is not logically consistent in the database.

10. A method for modifying a database stored on a first computer having a first processor, by use of a second processor of a second computer, the method comprising an export method and an import method, wherein the export method comprises the following steps:
selecting data from the database;
requesting export of the selected data;
verifying that the selected data are not reserved in the database;
constructing an export set comprising the selected data that are not reserved in the database;
reserving the selected data not reserved in the database;
generating a data exchange file comprising the data of the export set, the data exchange file being constructed according to a data exchange file model that describes types of data and links between the types of data in the database; and
transferring the data exchange file to the second computer;

wherein the import method comprises the following steps:
transferring a new data exchange file to the first computer, the new data exchange file comprising the data of the export set and modifications performed on the selected data by the second computer;
comparing the selected data of the new data exchange file with the selected data present in the database, so as to identify deletions of objects performed on the selected data;
verifying logical consistency of the modifications performed on the selected data, present in the new data exchange file, with respect to the selected data present in the database;
deleting in the database links and objects identified as logically consistent to delete;
modifying the selected data in the database; and
unreserving the selected data in the database.

* * * * *